(12) United States Patent  (10) Patent No.: US 8,109,735 B2
Gage et al.  (45) Date of Patent: Feb. 7, 2012

(54) COOLED COMPONENT WITH A FEATURED SURFACE AND RELATED MANUFACTURING METHOD

(75) Inventors: Raymond Gage, Phoenix, AZ (US); Adrian Allan, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 598 days.

(21) Appl. No.: 12/270,372

(22) Filed: Nov. 13, 2008

(65) Prior Publication Data

US 2010/0119372 A1  May 13, 2010

(51) Int. Cl.
 *F04D 29/38* (2006.01)
(52) U.S. Cl. .................................... 416/241 R
(58) Field of Classification Search .................. 416/224, 416/241 R
 See application file for complete search history.

(56) References Cited

U.S. PATENT DOCUMENTS

| | | | |
|---|---|---|---|
| 6,582,194 B1 * | 6/2003 | Birkner et al. | 416/97 R |
| 6,602,053 B2 * | 8/2003 | Subramanian et al. | 416/97 R |
| 6,921,014 B2 | 7/2005 | Hasz et al. | |
| 7,189,060 B2 | 3/2007 | Liang | |
| 7,407,365 B2 | 8/2008 | Dodd | |
| 2003/0209589 A1 | 11/2003 | Hasz et al. | |
| 2008/0019835 A1 | 1/2008 | McFeat et al. | |

* cited by examiner

*Primary Examiner* — Chandra Chaudhari
(74) *Attorney, Agent, or Firm* — Ingrassia Fisher & Lorenz, P.C.

(57) ABSTRACT

An improved type of cooled component is disclosed. The cooled components, such as turbine airfoils and combustors, have a base metal structural member, including a metal sheet or blank, with a featured surface. The features, such as fins, pins, and other protrusions, as well as divots, indentions, slots, channels, and holes, are formed by lithographic processes. The protrusions can be formed from a different material than the metal sheet or blank, preferably one with superior heat-conductive or oxidation properties. A related method of manufacturing is also disclosed.

20 Claims, 5 Drawing Sheets

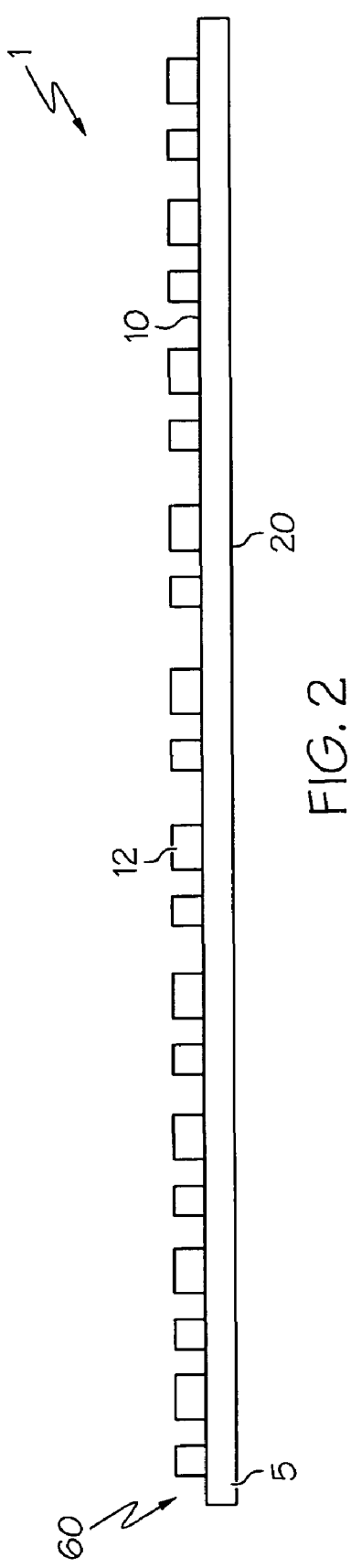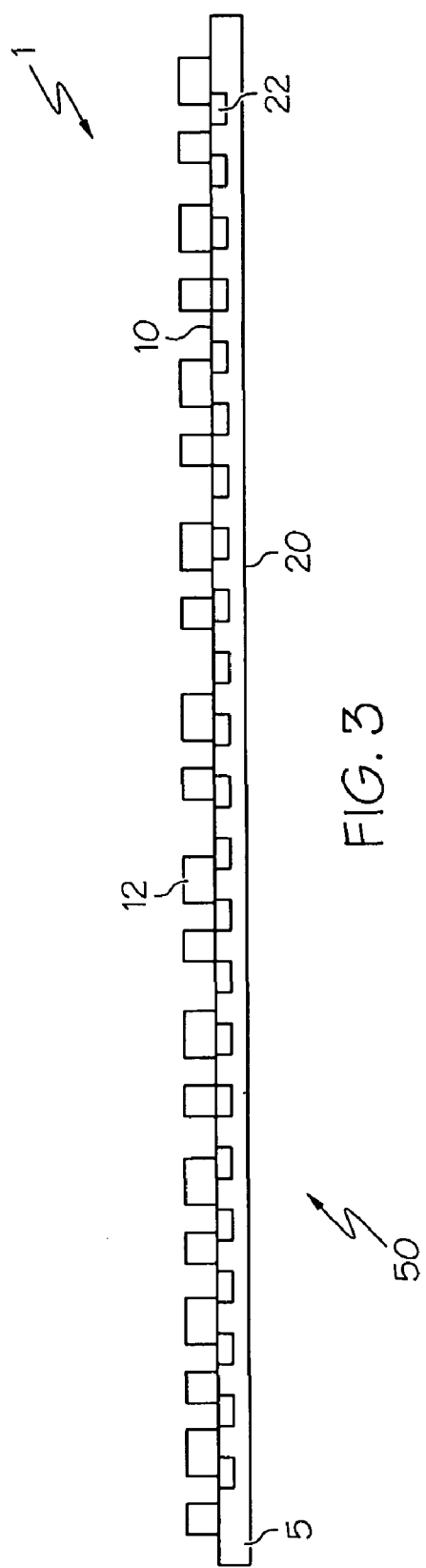

COOLED COMPONENT WITH A FEATURED SURFACE AND RELATED MANUFACTURING METHOD

TECHNICAL FIELD

Embodiments of the subject matter described herein relate generally to cooled component having featured surfaces. More particularly, embodiments of the subject matter relate to lithographed features on the surface of a cooled component.

BACKGROUND

Engines with cooled components, such as gas turbine engines, are often improved by altering different characteristics of an engine or its components. Some examples of alterable features include the weight of one or more components, the engine efficiency, and the cost of manufacture of the components or overall engine system. It is typically difficult, though preferable, to improve simultaneously as many aspects as possible.

Frequently, tradeoffs are made to produce different engines containing different characteristics, as desired for a particular purpose or role. As one example, an engine can often be designed with greater efficiency and reduced cost, but resulting in a higher engine weight. Similarly, an efficient, lightweight engine can often be made at a higher cost.

A turbine engine's performance can depend, among other things, on the ability to cool components, such as airfoils, to permit them to operate at higher temperatures. While this typically is done at the expense of another desirable engine characteristic or feature, it would be advantageous for an advancement to improve simultaneously one or more aspects of an engine without returning the benefit through a tradeoff.

One technique of improving heat transfer efficiency within an engine is to form divots, bumps, or holes in the surface of a component, increasing its surface area, and/or permitting the passage of gases through the component. To form such features, processes such as laser drilling or machining can be used. This can be expensive, and often increases the cost of the engine beyond any improvement from the increased efficiency. As another technique, some components can be cast. Disadvantageously, though cheaper, casting for fine holes or surface features often results in poor quality components, increasing the reject rate and cost.

BRIEF SUMMARY

A cooled component is disclosed. The cooled component has a sealing edge, an interior surface, and an exterior surface, wherein at least one of the interior surface and exterior surface has a featured surface comprising a plurality of lithographed features adapted to adjust the heat transfer properties of the cooled component.

A turbine blade is also provided. The turbine blade comprises a metal sheet having a first side and a second side, the first side having a first plurality of lithographed features, wherein at least some of the first plurality of lithographed features protrude away from the metal sheet and the first plurality of lithographed features is adapted to increase the surface area of the turbine blade.

A method of manufacturing a turbine blade is also provided. The method comprises applying a heat conductive layer to a metallic sheet, applying a lithographic mask to the heat conductive layer, the lithographic mask defining a pattern of features, etching the heat conductive layer using the lithographic mask as an etch mask to form an etched pattern of features in the heat conductive layer, and removing the lithographic mask.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a lengthwise profile view of the unformed airfoil surface of FIG. 1 from a first end;

FIG. 3 is a lengthwise profile view of the unformed airfoil surface of FIG. 1 from a second end;

DETAILED DESCRIPTION

Figure 1:
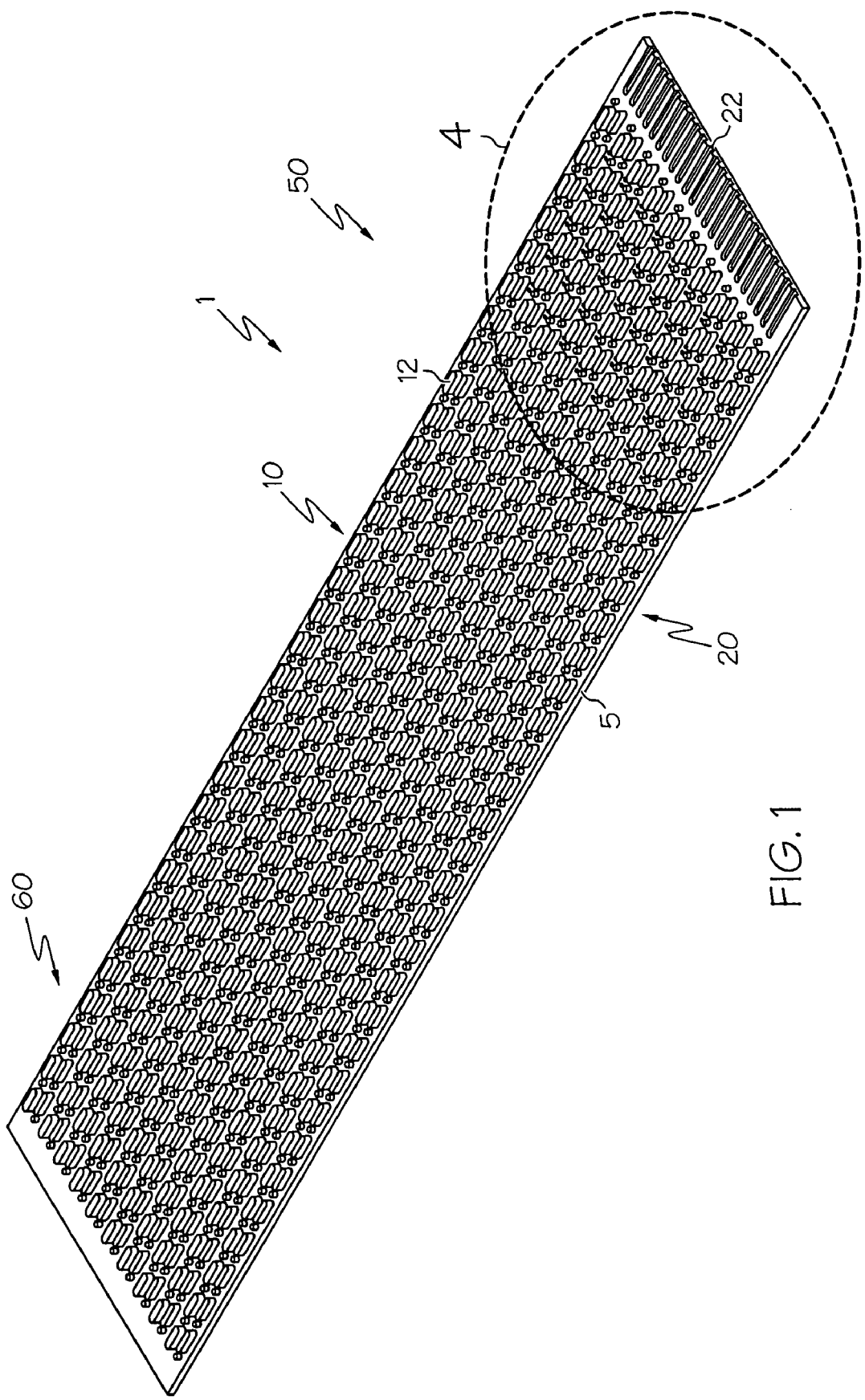
FIG. 1 is a perspective view of an unformed airfoil surface.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side", describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Figure 4:
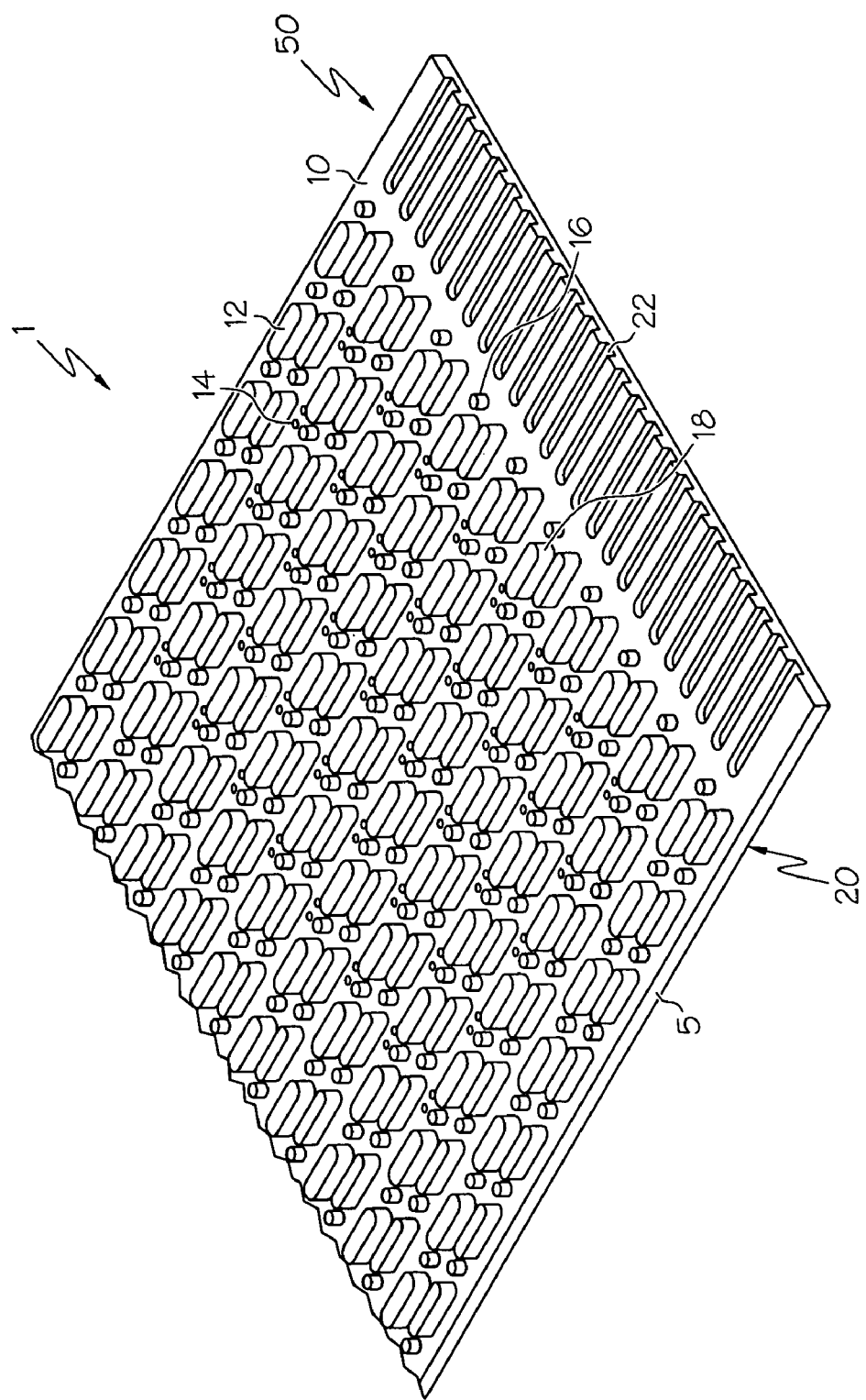
FIG. 4 is a detail view of an end of the unformed airfoil surface of FIG. 1.
Figure 5:
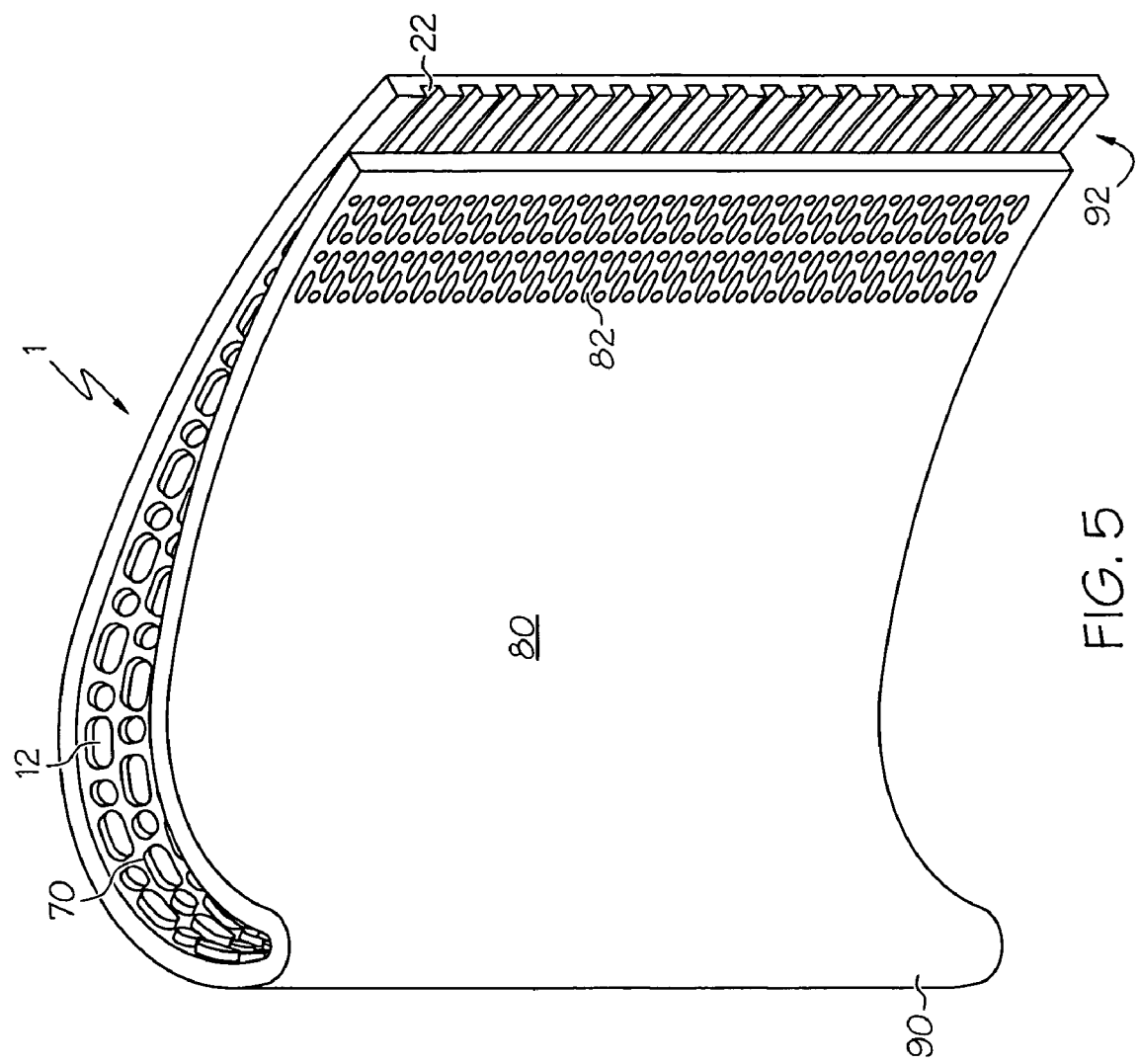
FIG. 5 is a perspective view of an airfoil formed from the surface of FIG. 1.

FIGS. 1-3 illustrate an unshaped airfoil 1 of a gas turbine engine. FIG. 4 shows a detail view of one end of the airfoil 1. FIG. 5 illustrates the airfoil 1 as shaped for use in the engine. The airfoil 1 comprises a metal sheet 5 having a first, upper surface 10 and a second, lower surface 20. The upper surface 10 comprises a plurality of features 12, such as protrusions or depressions, which increase its surface area. In certain embodiments, holes through the airfoil 1 can also be formed, permitting the passage of gases.

It is often advantageous to increase the efficiency of the engine in which the airfoil 1 is used by increasing the temperature of the fluid in which the airfoil 1 is situated. To maintain the airfoil 1 at a constant temperature, the airfoil is often cooled by a fluid passing through the interior 70 of the airfoil 1, best seen in FIG. 5. By increasing the surface area of the interior 70 of the airfoil 1 through the presence of the heat-conducting plurality of features 12, the airfoil 1 can maintain a constant, acceptable temperature when exposed to a higher temperature, relative to an airfoil without the plurality of features 12.

Accordingly, the airfoil 1 can be used in an engine operating at a higher temperature than an airfoil lacking the plurality of features 12. Thus, the engine's efficiency and power can be increased without substantial additional weight. Finally, because the plurality of features 12 can be formed through an inexpensive lithographic process, the savings from increased engine efficiency can more than offset the cost of manufacture of the plurality of features 12. Consequently, with a negligible increase in weight, a higher-efficiency engine capable of increased power without a net increased cost can be produced.

With reference to FIGS. 1-3, the airfoil 1 is preferably formed initially from a metal sheet 5. The metal sheet 5 can have a shape as shown, substantially rectangular, or other geometric shape as appropriate to the embodiment and device into which the sheet 5 is to be finally formed, as explained below. The metal sheet 5 is preferably composed of a metal, such as a steel, including stainless steel, aluminum, titanium, nickel- or cobalt-based superalloys, or alloys thereof, or any other suitable to the embodiment. In certain embodiments, other materials than metal can be used, if suitable.

The metal sheet 5 can have a first end 50 and a second end 60, as well as the upper surface 10 and lower surface 20. With reference to FIG. 2, the metal sheet 5 is depicted with the first end 50 in the foreground. FIG. 3 depicts the metal sheet 5 with the second end 60 in the foreground.

The metal sheet 5 can have one or more features disposed on one surface. Preferably, a plurality of features 12 is present on the surface. As shown, it can be the upper surface 10, though in some embodiments, features can also be disposed on the lower surface 20, or both surfaces. Although the features 12 have certain characteristics in the illustrated embodiment, other embodiments can contain all, some, or none of these specific characteristics, as appropriate and desirable. For example, although the upper surface 10 is shown with a substantial portion of its area comprising a featured surface, a smaller portion can be used on other sheets. As another example, while the features 12 are depicted as extending across substantially all of the width of the sheet 5, other sheets can have margins or borders free of features. As yet another example, although the features 12 are embodied as having a repeating pattern when examined lengthwise or across the width of the sheet 5, other patterns can be used, including those which repeat across only one direction of the sheet 5, or those which do not repeat.

Another characteristic of the features 12 which can vary is material composition. Preferably, a material with favorable heat conduction characteristics is selected. Such materials can include conductors such as silver, copper, or gold, or alloys thereof. Preferably, the material is also responsive to etching during a lithographic process.

The features 12, as described above, can vary in pattern between embodiments, including the sizes and shapes of protrusions, such as fins, or indentations or holes formed in the metal sheet 5 itself. As can be seen in FIG. 4, a single metal sheet can comprise a complex array of features, including holes 14, small protrusions 16, and large protrusions 18. Other features are also present, including some with variations. One example of a variation features is one that has substantially the same shape as a neighboring feature, but with a reduction or increase in scale, as shown.

Complex patterns and groupings of desirable size and shape can also be formed. For example, although fins having an elongated surface are used as the shape for the large protrusions 18 while the small protrusions 16 have a substantially circular surface, the two could be reversed, or a third type altogether could also be present. Accordingly, the protrusions, acting as fins, can be shaped as straight rectangular, triangular, or parabolic fins, semi-circular protrusions on the surface, or pin fins having a rectangular, triangular, or parabolic shape. Preferably, the features or fins have a regular cross-section as they extend away from the surface, though, as mentioned, geometric shapes which taper, either towards or away from the surface, can also be used as appropriate and desirable. The features 12 are preferably solid portions of the heat-conductive metal chosen and etched, as described below.

The characteristics of the features 12 can be selected to increase heat transfer efficiency from the metal sheet 5 to the surrounding environment. In those embodiments where a moving fluid is used to cool the surface of the metal sheet 5 comprising the features 12, the features 12 can be of a size and shape to improve cooling efficiency, depending on the characteristics of the fluid during use, such as velocity and viscosity. Thus, differences between types, shapes, sizes, and patterns of features 12 in a single embodiment can be created as desired for the embodiment.

In certain embodiments, the metal sheet 5 can have one or more channels 22 formed along one edge. Although shown along the first end 50, they can be present on either or both ends. As can be seen in FIG. 2, the channels can be indentations in the metal sheet 5 which do not extend completely between the surfaces 10, 20. In certain embodiments, the channels 22 can extend completely between the surfaces 10, 20, resembling slots along the edge of the first and/or second ends 50, 60. Preferably, the channels 22 do not extend into the portions of the upper and/or lower surfaces 10, 20 comprising the features 12. The channels 22 can be formed by the same lithographic process which creates the features 12. In certain embodiments, the channels 22 can be pre-formed in the metal sheet 5 during manufacture of the metal sheet 5, prior to lithographic formation of the features 12, or subsequent to the lithographic formation.

When formed into the airfoil shape depicted in FIG. 5, the airfoil 1 preferably is curved to form the desired airfoil shape. The first and second ends 50, 60 can be disposed adjacent each other to form the trailing edge 92 of the airfoil 1, or other curvature can be used. The leading edge 90 can be formed from an intermediate portion of the metal sheet 5. As can be seen, the former lower surface 20 and now exterior surface 80 can have one or a plurality of holes 82 through the metal sheet 5. The holes 82 can be formed by etching the metal sheet 5, and can not only increase the surface area of the sheet 5 for certain hole sizes, but also permit fluid to travel from the interior of the airfoil 1 to the surrounding environment, thereby adjusting the heat transfer properties of the metal sheet 5 in multiple ways. The increased surface area in the sheet 5 results from exposure of the sides of the hole or indentation, which can be greater than the unaltered surface, depending on the depth of the hole and/or thickness of the sheet 5.

As formed, the upper surface 10 with the features 12 can form the surface of the interior 70. The features 12 can be reduced or eliminated along the interior 70 in regions of relatively high deformation, as necessary or desired, to prevent interference between or overlap of the features in areas of high curvature.

When formed into an airfoil 1 as shown in FIG. 5, the channels 22 can permit fluid exchange between the interior of the airfoil 1 and its surrounding environment. Accordingly, should a cooling fluid be introduced into the interior of the airfoil 1 during its operation, the fluid can travel within the airfoil 1, along and over the features 12 to the trailing edge 92. The fluid can further pass through the channels 22 into the exterior, facilitating cooling and heat flow. Thus, although the first and second ends 50, 60 meet near the trailing edge 92, the channels 22 can extend past the contact region and meeting of the ends 50, 60.

In certain embodiments, the metal sheet 5 can be used as an airfoil in its formed shape. In other embodiments, the metal sheet 5 can be used as a liner or sheath adjacent, within, affixed to, or surrounding a structural airfoil component. Similarly, when features are desired on an external surface of the component, the metal sheet can be combined, as a lining or surface, with a structural portion of the component to form the desired finished piece. In some embodiments, the metal sheet 5 can be made of softer metals, such as lead, to facilitate forming the sheet 5 into the desired shape for the embodiment.

In certain embodiments where the metal sheet 5 is used in conjunction with other formed portions of an airfoil, combustor, or other component, some aspects, such as the holes through the metal sheet 5 or channels 22 can be unobstructed by other portions of the component, permitting them to continue to act as described. As one example, where the metal sheet 5 forms a liner on the interior of an airfoil, the channels 22 can extend past any other portions of the airfoil, permitting the fluid communication continue as described.

While certain aspects of the inventions disclosed herein are described in reference to an airfoil, other components of engines, including turbine engines, such as combustors, nozzle guide vanes, or "hot" section walls of engine components, such as hubs, shrouds, cases and casings, and the like, are also contemplated. Preferably, such components are exposed to a temperature difference, with one surface cooled by free or active convection. In such components, the metal sheet described above can be appropriately shaped so as to expose a surface comprising a plurality of lithographed features to the cooled or cooling environment. Thus, although an airfoil is used in the illustrated embodiment, combustors, fins, walls, and other components can be embodied as useful and appropriate to the application. In certain embodiments, the components can be formed by a joined curved flat metal sheet as described, though other embodiments can have different final forms, including an un-joined curve, or a flat surface, as desired.

Figure 6:
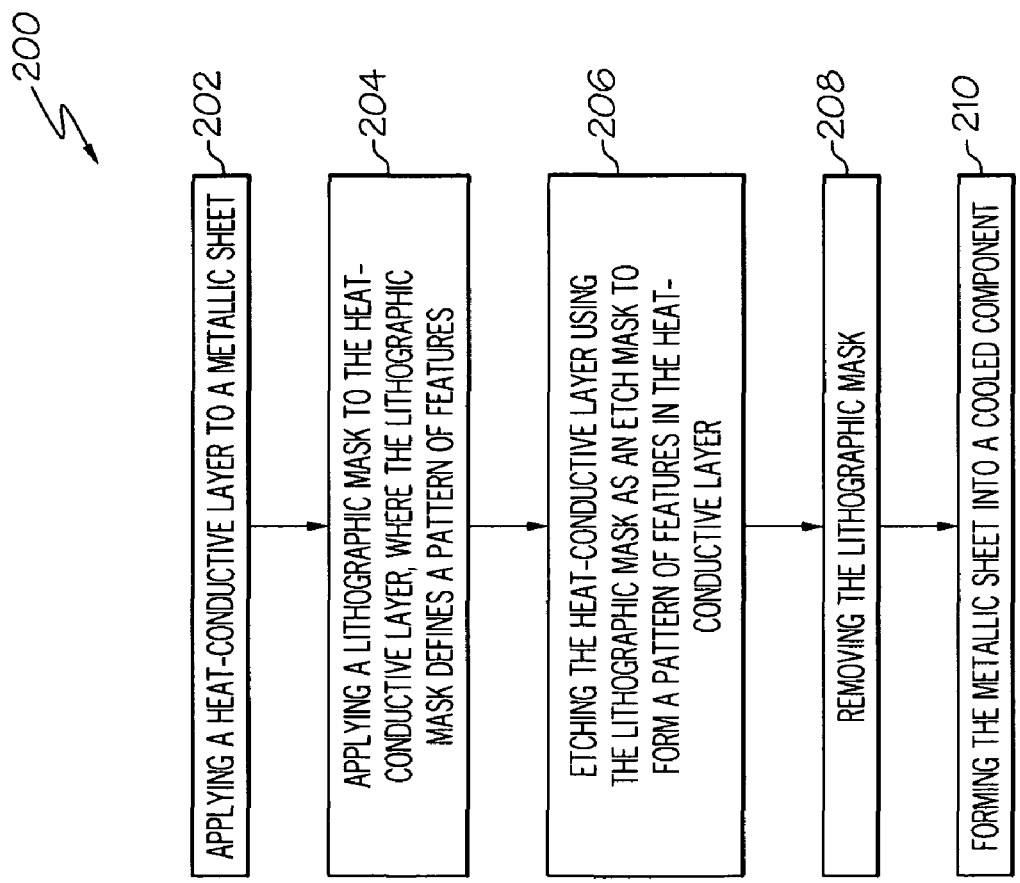
FIG. 6 is a schematic illustration of the steps of a process of producing a turbine airfoil having lithographic surface features.

FIG. 6 is a schematic showing the steps of a process for producing an airfoil similar to those described above. Certain steps may be combined into a single depicted element for simplicity of illustration, while requiring multiple or complex sub-steps.

FIG. 6 illustrates one method 200 of forming a metal sheet into an airfoil, combustor, or other cooled component, or a liner or sheath for such a component. A heat-conductive layer can be applied 202 to a metal sheet, either through bonding, adhesion, thermal methods, such as brazing or welding, or other mechanism. Subsequently, a lithographic mask can be applied 204 to the heat-conductive layer. The lithographic mask can be of any material or method as appropriate to the lithographic process used to form features from the heat-conductive layer. For example, where photolithography is used, a photoresist can be used. In some embodiments, an adhesion promoter can first be used to facilitate application of the photoresist. Application of the mask can be accomplished by any suitable approach, such as spin coating, spraying, laminating, or other deposition technique. The photoresist layer is then exposed in a selective manner and developed to form a mask that defines the intended pattern of features. In certain embodiments, lithographic masks can be used which do not require photographic exposure and/or development.

After application 204 of the mask, the heat-conductive layer can be etched 206 in accordance with the mask to produce a set or pattern of features in the heat-conductive layer as desired for use with the metal sheet. The etching can be accomplished chemically, for example, though other methods can be used. As described above, in certain embodiments, step 206 can comprise additional or repeated sub-steps. For example, proper etching of a heat-conductive layer may require multiple exposures to an etchant material to accomplish the desired etching. Thus, although step 206 only depicts one etching step, repeated steps, which may include certain other steps, such as the removal and re-application of a lithographic mask, may be required to accomplish step 206, and are contemplated as contained within the illustration as shown, and description as furnished below.

Subsequently, the mask can be removed 208 from the un-etched heat-conductive layer. The removal can be executed in any appropriate method, including, but not limited to, mechanically, thermally—resulting in "ashing" of the mask—or through alternate chemical methods. As described above, multiple etching steps may be repeated as needed to produce the desired features.

Certain features may require removal and reapplication of the same or a different mask to produce features having the desired size and/or shape. Additionally, following the desired etching of the heat-conductive layer, the metal sheet, including the featured heat-conductive layer, can be re-masked and etched with the effect of etching holes or depressions in the metal sheet to form one or more of the embodiments described above.

Finally, the metallic sheet can be formed 210 into an appropriate shape for its function as a cooled component. For example, where an airfoil is desired, the metallic sheet with the featured surface can be shaped to form the airfoil, with leading and trailing edges, as shown in FIG. 5. Where the ends of the metallic sheet join after forming the cooled component can be considered the sealing edge. The sealing edge can form a seam where the edges are sealed, or merely meet in close proximity without a sealing feature, such as a weld. In some embodiments, the sealing edge can comprise one or more of the features described above in relation to the trailing edge of the airfoil.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A cooled component having a sealing edge, an interior surface, and an exterior surface, the cooled component comprising:
   a metal sheet having an upper surface and a lower surface, the upper surface forming the interior surface of the cooled component and the lower surface forming the exterior surface of the cooled component; and
   a heat-conductive layer forming a feature surface on at least one of the interior surface and the exterior surface, the featured surface comprising a plurality of lithographed features adapted to adjust the heat transfer properties of the cooled component.

2. The cooled component of claim 1, wherein the plurality of lithographed features are at least partially composed of gold.

3. The cooled component of claim 1, wherein the plurality of lithographed features are at least partially composed of copper.

4. The cooled component of claim 1, wherein the plurality of lithographed features comprises a plurality of protrusions extending from the featured surface.

5. The cooled component of claim 4, wherein the plurality of lithographed features further comprises a plurality of indentations formed in the featured surface.

6. The cooled component of claim 4, wherein the plurality of lithographed features further comprises a plurality of holes extending through the interior surface.

7. The cooled component of claim 1, wherein the plurality of lithographed features comprises a plurality of indentations.

8. The cooled component of claim 1, wherein the cooled component comprises a single curved metal sheet.

9. The cooled component of claim 1, further comprising a channel adapted to fluidly connect the interior surface with the ambient atmosphere at the sealing edge extending from the interior surface to the exterior surface.

10. A turbine blade comprising a metal sheet having an upper surface and a lower surface, the upper surface having a first plurality of lithographed features, wherein at least some of the first plurality of lithographed features protrude away from the metal sheet and the first plurality of lithographed features is adapted to increase the surface area of the turbine blade.

11. The turbine blade of claim 10, wherein the first plurality of lithographed features is formed using a photolithographic process.

12. The turbine blade of claim 10, wherein the lower surface has a second plurality of lithographed features adapted to receive heat from the metal sheet.

13. The turbine blade of claim 12, wherein at least some of the second plurality of lithographed features comprise a hole in the metal sheet.

14. The turbine blade of claim 10, wherein the first plurality of lithographed features are arranged in a repeating pattern.

15. The turbine blade of claim 10, wherein the first plurality of lithographed features comprises features formed during multiple etching processes.

16. The turbine blade of claim 10, wherein the first plurality of lithographed features comprises features having different heights relative to the upper surface.

17. The turbine blade of claim 10, wherein at least some of the first plurality of lithographed features comprise holes in the metal sheet.

18. The turbine blade of claim 10, wherein at least some of the first plurality of lithographed features are formed of a conductive layer disposed on the upper surface of the metal sheet.

19. A method of manufacturing a turbine blade comprising:
   applying a heat conductive layer to a metallic sheet;
   applying a lithographic mask to the heat conductive layer, the lithographic mask defining a pattern of features;
   etching the heat conductive layer using the lithographic mask as an etch mask to form an etched pattern of features in the heat conductive layer; and
   removing the lithographic mask 20. The method of manufacture of claim 19, further comprising the step of etching the metallic sheet to create a hole in the metallic sheet.

* * * * *